No. 874,270. PATENTED DEC. 17, 1907.
O. WEHRLE.
CHOPPING AND EXTRACTING APPARATUS.
APPLICATION FILED NOV. 2, 1906.
Fig. 1.
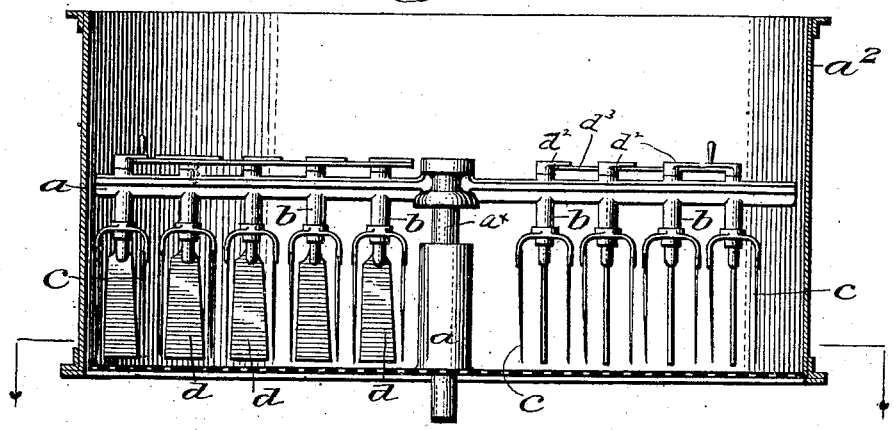
Fig. 2.
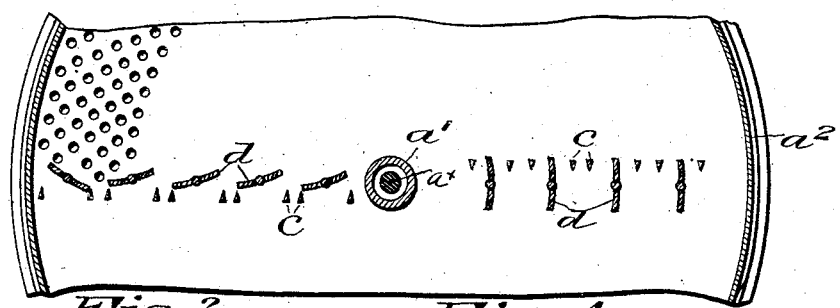
Fig. 3. Fig. 4. Fig. 5.
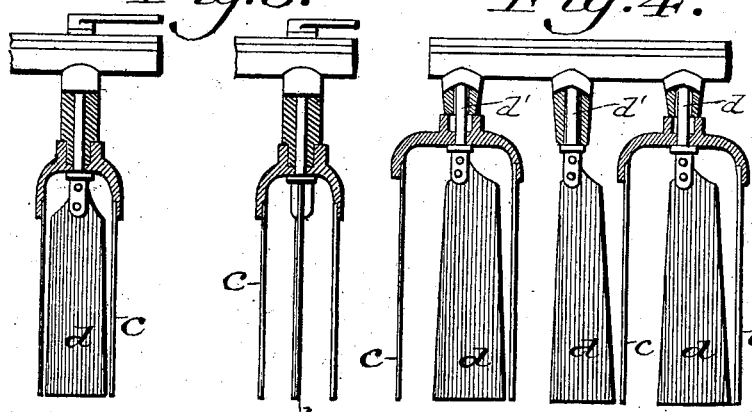
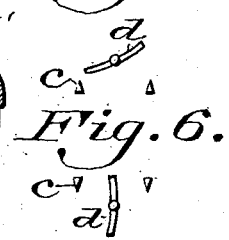
Fig. 6.
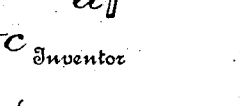
Witnesses
P. F. Nagle
L. Douville
Inventor
Otto Wehrle
By Diedersheim & Fairbanks
Attorneys

UNITED STATES PATENT OFFICE.

OTTO WEHRLE, OF EMMENDINGEN, GERMANY.

CHOPPING AND EXTRACTING APPARATUS.

No. 874,270.  Specification of Letters Patent.  Patented Dec. 17, 1907.

Application filed November 2, 1906. Serial No. 341,667.

*To all whom it may concern:*

Be it known that OTTO WEHRLE, a subject of the Emperor of Germany, residing at 36 Hochburgerstrasse, Emmendingen, Baden, in the Empire of Germany, manufacturer, has invented certain new and useful Improvements in Chopping and Extracting Apparatus, of which the following is a specification.

This invention relates to certain new and useful improvements in devices for hastening lixiviation in brewing apparatus, and it has for its object among others to provide an improved mechanism for this purpose by which the extraction material is pressed and forced against the wall of the vat and the blades for this purpose constructed to also serve to cut the material.

Other objects and advantages of the invention will hereinafter appear and the novel features thereof will be particularly pointed out in the appended claims.

The invention is clearly illustrated in the accompanying drawings, which, with the letters of reference marked thereon, form a part of this specification, and in which Figure 1 is an elevation showing my improved construction. Fig. 2 is a detail in plan with portions broken away, and parts in section. Fig. 3 is an enlarged detail, partly in elevation and partly in section. Fig. 4 is a view with the blades shown at an angle to the position in which they are seen in Fig. 3. Fig. 5 is a bottom plan of one blade and two knives seen at the left of Fig. 3. Fig. 6 is a similar view of the blade and knives seen at the right of Fig. 3.

Like numerals of reference indicate like parts in the different views.

It is desirable that provision should be made for insuring that the knives or blades be constructed to both cut and extract. At the beginning of the operation the broad blades may be set with their broad surfaces tangential to the line of motion and subsequently set at right angles thereto when it is desired to change the nature of their operation. These blades thus serve in one instance as knives for cutting, and in the other instance as pressers for forcing and pressing the extraction material against the walls of the vat.

$a\ a$ represent two arms carried by a revoluble support $a^\times$ revoluble within the tubular support $a'$ within the cylinder or vat $a^2$. The rotation of the support $a^\times$ and arms $a\ a$ may be produced by any simple well-known mechanism. Pendent from these arms are the carriers $b$ which support the knives $c$. The knives are ordinary blade knives and are designed to cut through the mass within the cylinder. As they are not designed to coöperate in the extraction they are made comparatively thin. Between each pair of these blades or knives, which latter have a fixed position, is a broad rotatable vane or blade $d$ vertically mounted for rotation within the carrier $b$. These vanes are rectilinear vertically and are somewhat curved horizontally. By reason of these vanes being curved approximately in the radius in which they travel, they constitute actual knives in this path, while such curvature renders them stiff and not so readily bent, so that when they are suitably turned, they serve as extractor vanes, they all assuming an oblique position for the purpose of pressing and forcing the extraction material against the wall of the vat. In order that all of these vanes may be turned simultaneously their stems $d'$ extend above the arms $a\ a$, as seen, and are provided with the crank arms $d^2$ connected by a suitable rod or bar $d^3$.

What I claim as new is:—

1. In a device of the character described, a rotatable support, thin knives for cutting, and between said knives, rotatable thin blades adapted to serve for both cutting and extracting, said knives and blades being carried by said support.

2. In a device of the character described, a rotatable support, thin knives for cutting, and between said knives, rotatable thin curved blades adapted to serve for both cutting and extracting, said knives and blades beidg carried by said support.

3. In a device of the character described, rotatable arms, knives for cutting fixed relatively to said arms, and rotatable blades between said knives and adapted to serve for both cutting and extracting.

4. In a device of the character described, rotatable arms, knives for cutting fixed relatively to said arms, and rotatable curved, thin blades between said knives and adapted to serve for both cutting and extracting.

In testimony whereof I affix my signature in presence of two witnesses.

OTTO WEHRLE.

Witnesses:
 FERD. C. MEILLER,
 AGNES SCHULTZE.